US009203871B2

(12) United States Patent
Clark et al.

(10) Patent No.: US 9,203,871 B2
(45) Date of Patent: Dec. 1, 2015

(54) METHOD AND SYSTEM FOR CONVERTING SESSION INITIATION MESSAGES

(71) Applicant: BCE INC., Verdun (CA)

(72) Inventors: David William Clark, Carp (CA); Jonathan Allan Arsenault, Orleans (CA); Nathan Gerald Archer, Russell (CA)

(73) Assignee: BCE INC., Verdun (CA)

( * ) Notice: Subject to any disclaimer, the term of this patent is extended or adjusted under 35 U.S.C. 154(b) by 122 days.

(21) Appl. No.: 13/625,356

(22) Filed: Sep. 24, 2012

(65) Prior Publication Data

US 2013/0022055 A1 Jan. 24, 2013

Related U.S. Application Data

(63) Continuation of application No. 12/654,573, filed on Dec. 23, 2009, now Pat. No. 8,275,896.

(51) Int. Cl.
*H04L 29/06* (2006.01)

(52) U.S. Cl.
CPC ...... *H04L 65/1066* (2013.01); *H04L 29/06068* (2013.01); *H04L 65/104* (2013.01)

(58) Field of Classification Search
CPC .................... H04L 2012/5629; H04L 49/255; H04L 29/06068; H04L 29/06095
USPC ...................................... 370/395.2, 466, 467
See application file for complete search history.

(56) References Cited

U.S. PATENT DOCUMENTS 7,002,912 B2 2/2006 Wengrovitz
7,330,542 B2 2/2008 Kauhanen et al.
7,496,089 B2 2/2009 Hiroshima et al.
7,496,672 B2 2/2009 Orton et al.
7,522,712 B2 4/2009 Inon
7,660,293 B2 2/2010 Itagaki et al.
7,698,433 B2 4/2010 Gallant
7,813,492 B2 10/2010 Kauhanen et al.
7,852,859 B2 12/2010 Wengrovitz et al.

(Continued)

OTHER PUBLICATIONS

Ditech Networks, "SBC with Far-end NAT Traversal, Inter-Carrier Peering, and Security", http://www.ditechnetworks.com/platforms/productdetail.aspx?pid=41, Dec. 22, 2009.

(Continued)

*Primary Examiner* — Warner Wong
(74) *Attorney, Agent, or Firm* — Gowling Lafleur Henderson, LLP

(57) ABSTRACT

A network entity comprising an input for receiving from a given IP device, a session initiation message for initiating a communication session over a packet based network via a session initiation message generated according to a particular session initiation protocol and a processing entity. The processing entity is operative for detecting a characteristic associated with the given IP device, determining, at least in part on the basis of the characteristic associated with the given device, a given interface module from a plurality of interface modules for processing the session initiation message generated according to the particular session initiation protocol and causing the first session initiation message generated according to the particular session initiation protocol to be processed by the given interface module for converting the first session initiation message into a second session initiation message generated according to a pre-determined session initiation protocol.

19 Claims, 6 Drawing Sheets

(56) References Cited

U.S. PATENT DOCUMENTS

| | | | | |
|---|---|---|---|---|
| 8,040,873 | B2 | 10/2011 | Wengrovitz et al. | |
| 8,204,065 | B2 * | 6/2012 | Zancan | 370/401 |
| 2003/0021264 | A1 | 1/2003 | Zhakov et al. | |
| 2004/0015589 | A1 | 1/2004 | Isozu | |
| 2004/0081196 | A1 * | 4/2004 | Elliott | 370/465 |
| 2004/0114575 | A1 | 6/2004 | Morita et al. | |
| 2004/0125757 | A1 | 7/2004 | Mela et al. | |
| 2004/0199649 | A1 * | 10/2004 | Tarnanen et al. | 709/230 |
| 2005/0083916 | A1 * | 4/2005 | Itagaki et al. | 370/352 |
| 2005/0201304 | A1 | 9/2005 | Olshansky | |
| 2007/0198681 | A1 | 8/2007 | Bakke et al. | |
| 2007/0259651 | A1 | 11/2007 | Bae et al. | |
| 2008/0167035 | A1 * | 7/2008 | Buckley et al. | 455/435.1 |
| 2008/0219223 | A1 * | 9/2008 | Bienas et al. | 370/338 |
| 2008/0310312 | A1 | 12/2008 | Acharya et al. | |
| 2008/0320148 | A1 * | 12/2008 | Capuozzo et al. | 709/227 |
| 2010/0177766 | A1 | 7/2010 | daCosta et al. | |
| 2011/0051712 | A1 * | 3/2011 | Ait-Ameur et al. | 370/352 |
| 2011/0103372 | A1 * | 5/2011 | Shatsky et al. | 370/352 |
| 2011/0154222 | A1 | 6/2011 | Srinivasan et al. | |

OTHER PUBLICATIONS

Examiner's Report issued Jun. 6, 2012 in connection with Canadian Patent Application 2,688,992, 4 pages.

Notice of Allowance issued May 23, 2012 in connection with U.S. Appl. No. 12/654,573, 10 pages.

Office Action issued Dec. 5, 2011 in connection with U.S. Appl. No. 12/654,573, 18 pages.

* cited by examiner

38

| | 50 | 54 | 56 |
|---|---|---|---|
| | Characteristic | Session Initiation Protocol | Interface Module |
| $44_1$ | Vendor A | $sip_1$ | INT $Module_1$ |
| $44_2$ | Vendor B | $sip_2$ | INT $Module_2$ |
| $44_3$ | Vendor C | $sip_3$ | INT $Module_3$ |
| $44_4$ | Vendor A | $sip_1$ | INT $Module_1$ |
| | ⋮ | ⋮ | ⋮ |
| | IP $Address_1$ | $sip_1$ | INT $Module_1$ |
| $44_k$ | IP $Address_2$ | $sip_2$ | INT $Module_2$ |

FIG. 4

METHOD AND SYSTEM FOR CONVERTING SESSION INITIATION MESSAGES

CROSS-REFERENCE TO RELATED APPLICATIONS

The present application is a continuation of, and claims the benefit of, U.S. patent application Ser. No. 12/654,573 filed on Dec. 23, 2009. The aforementioned application is hereby incorporated by reference herein.

FIELD OF THE INVENTION

The present invention relates generally to a method and system for facilitating a session initiation message generated by an IP communication device to be understood by receiving IP communication devices, and more specifically, to a method and system for initiating an action when a session initiation message generated by an IP communication device was not generated according to a pre-determined session initiation protocol.

BACKGROUND

In recent years, more and more individuals and organizations have started using packet based networks, such as the Internet, for communication purposes. For example, the use of VoIP and IP video conferencing are gaining in popularity since they offer both cost savings and improved functionality in the handling of the communication sessions. In order to establish communication sessions over a packet-based network, different signaling protocols have been developed that are responsible for controlling the setup, modification and teardown of data exchange sessions between users on an IP network. One such signaling protocol that is commonly used is the Session Initiation Protocol (SIP).

In order to accommodate the increased interest in communication over packet-based networks, many different vendors offer a range of different IP communication devices that are able to conduct IP communication sessions over a packet-based network. Examples of IP communication devices include ATAs, softphones, VoIP Phones and IP Private Branch Exchange (PBX) systems. While the large variety IP communication devices being offered by different vendors is appealing to consumers, different vendors often provide IP equipment that use vendor-specific signaling protocols. These vendor specific signaling protocols often create session initiation difficulties when two IP communication devices that use different signaling protocols are attempting to establish an IP communication session.

Many session initiation protocols, such as SIP, are relatively flexible standards that leave room for variations and vendor-specific extensions to be added. In some cases, these variations may not hinder the control of a communication session. However, in many circumstances, and especially when more advanced communication features such as call transfer and three-way conferencing are being requested, differences in the signaling protocols used by two communicating IP communication devices can cause difficulties in the establishment of the communication session and the proper implementation of the advanced communication features.

Against this background, it can be seen that there is a need in the industry to improve the manner in which IP communication sessions are established between different IP communication devices.

SUMMARY OF THE INVENTION

In accordance with a first broad aspect, the present invention provides a method, comprising at a processing entity, detecting a characteristic associated with a given device, the given device attempting to initiate a communication session over a packet based network via a session initiation message generated according to a particular session initiation protocol. The method further comprises at the processing entity, determining, at least in part on the basis of the characteristic associated with the given device, a given interface module from a plurality of interface modules for processing the session initiation message generated according to the particular session initiation protocol and at the processing entity, causing the session initiation message generated according to the particular session initiation protocol to be processed by the given interface module for converting the session initiation message into a session initiation message generated according to a pre-determined session initiation protocol.

In accordance with a second broad aspect, the present invention provides a method, comprising at a processing entity, detecting a characteristic associated with a given device, the given device attempting to initiate a communication session over a packet based network via a session initiation message generated according to a particular session initiation protocol. The method further comprises at the processing entity, comparing the characteristic associated with the given device to a plurality of device characteristics stored in a data structure for determining a matching device characteristic from the plurality of device characteristics, the data structure storing associations between device characteristics and a plurality of session initiation protocols and at the processing entity, initiating an action when the matching device characteristic is associated with a session initiation protocol from the plurality of session initiation protocols that is not a pre-determined session initiation protocol.

In accordance with a third broad aspect, the present invention provides a system that comprises a data structure and a processing entity. The data structure stores associations between (i) a plurality of interface modules and (ii) device characteristics associated with a plurality of devices capable of initiating communication sessions over a packet-based network. The processing entity is operative for detecting a characteristic associated with a given device that is attempting to initiate a communication session over a packet based network via a session initiation message generated according to a particular session initiation protocol, accessing the data structure for determining, at least in part on the basis of the characteristic of the given device, a given interface module from the plurality of interface modules and causing the first session initiation message generated according to the particular session initiation protocol to be processed by the given interface module for converting the first session initiation message into a second session initiation message generated according to a pre-determined session initiation protocol.

In accordance with a fourth broad aspect, the invention provides a network entity, comprising an input for receiving from a given IP device, a session initiation message for initiating a communication session over a packet based network via a session initiation message generated according to a particular session initiation protocol and a processing entity. The processing entity is operative for detecting a characteristic associated with the given IP device, determining, at least in part on the basis of the characteristic associated with the given device, a given interface module from a plurality of interface modules for processing the session initiation message generated according to the particular session initiation protocol and causing the first session initiation message generated according to the particular session initiation protocol to be processed by the given interface module for converting the first session initiation message into a second session initiation message generated according to a pre-determined session initiation protocol.

In accordance with a fourth broad aspect, the invention provides a computer readable storage medium comprising a program element for execution by a processing entity. The program element comprises a first program code for detecting a characteristic associated with a given device, the given device attempting to initiate a communication session over a packet based network via a session initiation message generated according to a particular session initiation protocol, a second program code for determining, at least in part on the basis of the characteristic associated with the given device, a given interface module from a plurality of interface modules for processing the session initiation message generated according to the particular session initiation protocol and a third program code for causing the first session initiation message generated according to the particular session initiation protocol to be processed by the given interface module for converting the first session initiation message into a second session initiation message generated according to a predetermined session initiation protocol.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 4 shows a non-limiting example of a data structure according to the present invention;

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
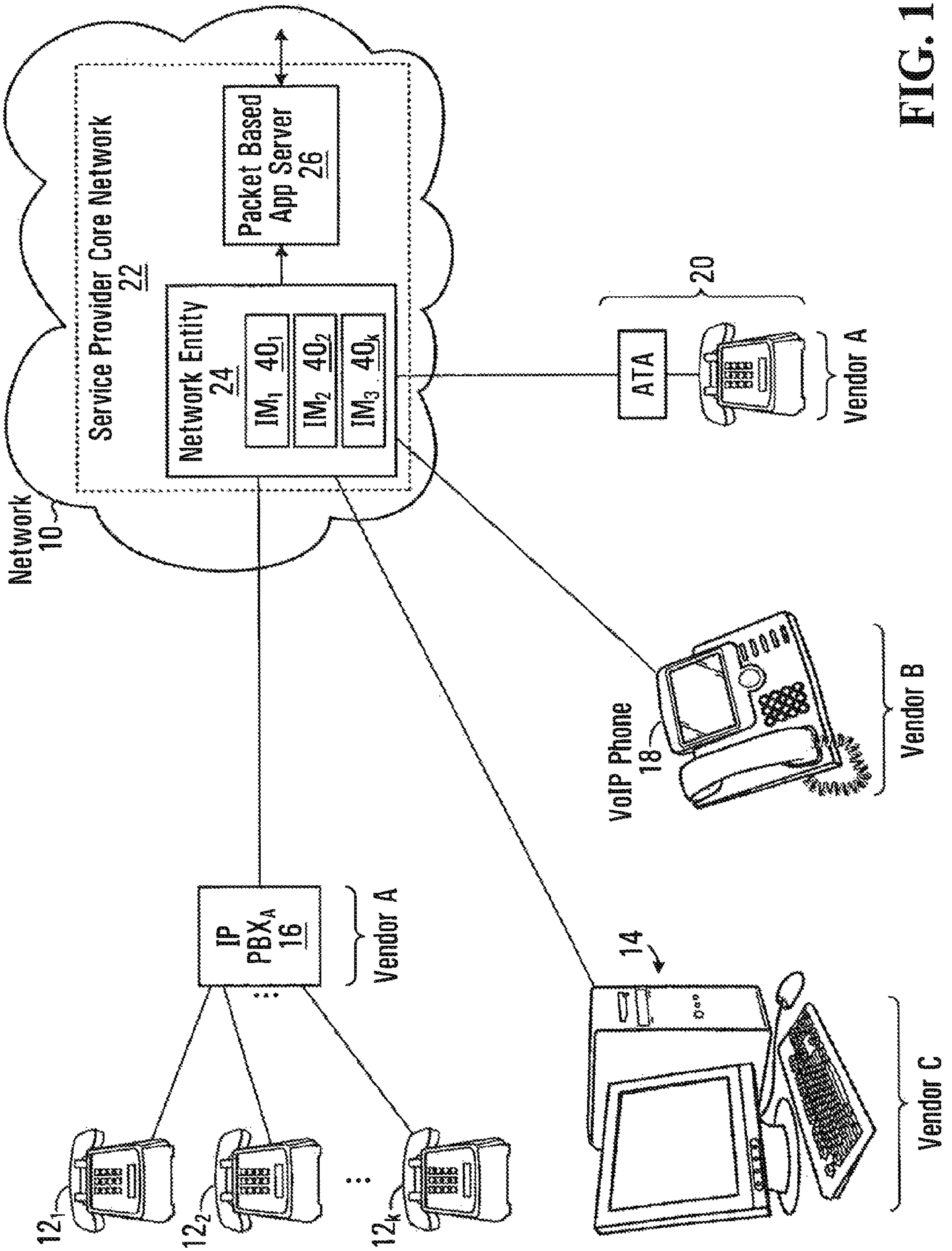
FIG. 1 shows a non-limiting block diagram of a communications network architecture according to a first example of implementation of the present invention.

Shown in FIG. 1 is a non-limiting example of a communications network architecture that is suitable for enabling IP communication sessions to take place over a packet-based network 10, such as the Internet. Such communication sessions can include Voice-over-Internet-Protocol (VoIP) sessions, IP Video Conferencing sessions, Instant Messaging (IM) sessions, file transfers and machine-to-machine real-time communications, among other possibilities.

In the embodiment shown in FIG. 1, the communications network architecture includes the packet based network 10 (which could be the Internet) and a plurality of IP communication devices 14, 16, 18 and 20. In the non-limiting embodiment shown, the IP communication devices 14, 16, 18, 20 include an IP Public Branch Exchange (PBX) 16 that is connected to a plurality of phones $\mathbf{12}_{1\text{-}k}$ (which could be VoIP phones or POTS phones, among other possibilities), a soft phone (i.e., a computer equipped with IP telephony software) 14, a VoIP phone 18 and a POTS phone equipped with an analog terminal adapter (ATA) 20. It should be appreciated that other types of IP communication devices that are known in the art can also be included without departing from the spirit of the invention. For example, a video conferencing device that is able to transmit/receive video data over the packet based network 10 is also included within the scope of the present invention.

It should be appreciated that although FIG. 1 shows only one IP PBX 16, one softphone 14, one VoIP communication device 18, and one ATA enabled POTS phone 20, the communication architecture 10 is suitable for supporting hundreds of thousands, if not more, IP communication devices.

The packet-based network 10 is responsible for handling communications either originating from, or destined for, the IP communication devices 14, 16, 18 and 20. It should be appreciated that the packet based network 10 enables the IP communication devices 14, 16, 18 and 20 to reach, or be reached by, any of various other communication devices (which are not shown for the sake of simplicity) and which can be other IP communication devices, or non-IP communication devices that function in a Public Switched Telephone Network (PSTN) or wireless network environment, such as a POTS phone or a cell phone, among other possibilities.

In order to enable non-IP communication devices to be able to participate in communication sessions with the IP communication devices 14, 16, 18 and 20, the packet based network 10 includes a plurality of packet-based application servers 26 (only one shown, for simplicity) that are able to route communication sessions to other network portions, such as the Public Switched Telephone Network (PSTN) or a wireless network, via various appropriate gateways. Gateways that enable communication and interoperability between the different network portions are known in the art, and as such will not be described in more detail herein.

For the IP communication devices 14, 16, 18 and 20 to be able to participate in communication sessions using the packet based network 10, the IP communication devices 14, 16, 18 and 20 generally subscribe to a service provider that provides access to the packet based network 10. There can be multiple different service providers that operate and manage access to the packet based network 10, each of which has a respective core network. For the sake of simplicity, only one service provider core network 22 has been shown in FIG. 1, but it should be appreciated that multiple service provider core networks are able to operate and manage communication between hundreds of thousands of communication devices over the packet based network 10. In addition, these different service provider core networks 22 are able to interact and communicate with one another in order to facilitate communication between communication devices that subscribe to different service providers.

In the non-limiting embodiment shown, the service provider core network 22 includes a network entity 24 and a packet-based application server 26 (i.e. a softswitch). The network entity 24 may be a session border controller that is operative to exert control over the signaling used to set up, conduct and tear down IP communication sessions involving one or more IP communication devices. As will be described in more detail below, the network entity 24 is also able to provide data conversion functionality for converting signaling data received during IP communication sessions.

The network entity 24, which as mentioned above can be a session border controller, may also be operative for provisioning new IP communication devices that are newly interacting with the packet-based network 10. This provisioning step may involve assigning an IP address to the IP communication device that can be used to identify and route calls to the IP communication device. As will be described in more detail below, during the provisioning stage, the network entity 24 may further create an entry in a data structure that includes an association between the assigned IP address and an interface module that is suitable for processing session initiation messages generated by the IP communication device. The entry may further include an association between the assigned IP address and other information associated with the IP communication device.

As shown in FIG. 1, the network entity 24 is communicatively connected to a packet-based application server 26 that is operative for processing and routing calls via the packet-based network 10. In general, the packet-based application server 26 allows for increased flexibility and functionality to be applied to the handling of communications originating from, destined for, or ongoing at the IP communication devices 14, 16, 18 and 20. Packet-based application servers 26 are generally known in the art, and as such will not be described in more detail herein. In a non-limiting example, the packet-based application server 26 may be an MCS 5200 Soft Switch manufactured by Nortel Networks Limited of 8200 Dixie Road, Brampton, Ontario L6T 5P6, Canada, although it should be appreciated that this is but one example among many possibilities within the scope of the present invention.

Although only one packet-based application server 26 is shown in FIG. 1, it will be appreciated that the service provider core network 22 may include multiple interconnected packet-based applications servers 26. In such cases, the multiple interconnected packet-based application servers 26 may communicate with one another over physical or wireless links, so as to share information and complete the routing of calls.

When an IP communication device (such as one of IP communication devices 14, 16, 18 and 20) is involved in an IP communication session with another communication device, the IP communication device generates and issues communication session data that is routed through the packet based network 10. The communication session data from the IP communication device may include:

(i) header information;

(ii) session initiation messages; and (iii) communication media streams that carry the communication session's audio, video or other communication data.

The session initiation messages that are issued during the course of a communication session include signaling information that is used to create, modify and/or terminate the IP communication session. The session initiation messages may include:

source and destination information;

information regarding the type of IP communication session desired, such as whether the IP communication session is intended to be a two-way communication session or a multi-way communication session;

information relating to the communication session handling, such as call transfer, hold, reject call, or modified Caller Line ID; and information for terminating a communication session.

In general, session initiation messages generated by a given IP communication device are generated according to a particular session initiation protocol that is used by that IP communication device. As used herein, the term session initiation protocol refers to any signaling and call set-up protocol that can be used to initiate, create, modify or terminate IP communication sessions. For example, the session initiation protocol may be any suitable signaling protocol such as the Session Initiation Protocol (SIP), H.323 and MGCP, among other possibilities. The team session initiation protocol may also refer to different versions of the same protocol. For example, even though the SIP may be considered a standardized protocol, it is relatively flexible given that adherence to the protocol is not rigidly enforced and extensions are allowed. As such, different vendors of SIP equipment often develop proprietary implementations of the standard, or possibly use different versions of SIP, which for the purpose of the present application can be considered two different session initiation protocols.

In accordance with the present invention, a session initiation protocol can be a peer-to-peer protocol, such that session initiation messages generated according to a particular session initiation protocol are considered by the two, or more, IP communication devices participating in the IP communication session, and not necessarily by equipment within the core network 22. For example, call handling features that are outlined in session initiation messages could be implemented by the communicating endpoints; namely the originating IP communication device and the destination IP communication device. In some cases, there are features that may be implemented by a soft switch, instead of the two end devices (originating and destination devices). For example, in the case of a privacy feature, privacy may be invoked at the originating end and communicated to the soft switch where the actual originating end is masked to the terminating end.

In the case where an IP communication device (such as one of IP communication devices 14, 16, 18 and 20) is involved in a communication session with a non-IP communication device (such as a POTS phone), the session initiation messages that are generated by the IP communication device are considered by network equipment, such as the packet-based application server 26 that is routing the call to the POTS phone through the PSTN network. More specifically, the network equipment considers the session initiation messages from the IP communication device, and then uses the signaling system 7 (SS7) signaling protocol, to exchange control information with the PSTN network for setting up the communication session.

The exchange of session initiation messages can occur throughout the duration of a communication session in order to set-up, carry-on, alter, redirect, and terminate the IP communication session. As such, when an IP communication device issues a session initiation message, a response session initiation message is often returned by the destination IP communication device, or in some cases, by the network equipment that is routing the communication session to a non-IP communication device, in other cases.

As previously mentioned, many session initiation protocols have flexible standards, such that different IP communication devices that communicate over the packet-based network may generate session initiation messages according to different session initiation protocols. For example, different manufacturers or vendors of IP communication devices may build their respective IP communication devices to generate session initiation messages according to different session initiation protocols. Some vendors add vendor-specific extensions to known session initiation protocols, so as to customize the session initiation protocol being used by their IP communication devices. The extensions should not "break" a session, but may be ignored by IP communication devices that do not recognize those extensions.

In the non-limiting embodiment shown in FIG. 1, there are four different IP communication devices 14, 16, 18 and 20 that are able to participate in communication sessions over the packet-based network 10. These IP communication devices may also be referred to as sip User Agents (sip UAs), which are network endpoints used to originate and/or receive session initiation messages for creating, maintaining and terminating a sip session.

In operation, when two different IP communication devices attempt to establish an IP communication session, it is possible that these two different IP communication devices will each generate session initiation messages according to different session initiation protocols. This can lead to a situation where an originating IP communication device and a destination IP communication device may have difficulty being able to read and/or correctly interpret the session initiation messages generated by each other. This is particularly problematic in the case where advanced features, such as call transfer and call hold, are requested in the session initiation messages that are being exchanged. For example, a call hold feature may be represented in a first manner according to the session initiation protocol being used by the originating IP communication device, but may be represented in a completely different manner according to a session initiation protocol being used by the destination IP communication device. This inability to properly interpret a session initiation message can obviously lead to difficulty in the two different IP communication devices establishing or maintaining a communication session as was intended according to the call set-up or call modification information included in the session initiation messages.

In accordance with the present invention, in order to help IP communication devices (or in some cases the network equipment routing the IP communication session to a POTS or cell phone) to accurately read and understand session initiation messages, the network entity 24 may cause an action to occur that will help to reduce the likelihood that session initiation messages originating from an originating IP communication device will be mis-understood by a receiving IP communication device (or network equipment). The manner in which this is done will be described in more detail below.

A. Session Initiation Protocol Conversion

A first manner in which the network entity 24 can attempt to reduce the likelihood that a session initiation message from an IP communication device will be mis-understood by a receiving IP communication device, will now be described in more detail with reference to FIG. 1 and the flow chart shown in FIG. 2.

With reference to FIG. 1, let us assume that IP communication devices 16 and 20 are from vendor A, while IP communication device 14 is from vendor C and IP communication device 18 is from vendor B. Given the flexible nature of session initiation protocols, it is possible that the IP communication devices from each of these different vendors generates session initiation messages according to different session initiation protocols that cannot be accurately read and/or understood by the IP communication devices from other vendors.

For the sake of example, let us assume that telephone $\mathbf{12}_1$ is attempting to initiate a communication session with IP communication device 18. Upon detection at IP communication device 16 (the IP PBX) that telephone $\mathbf{12}_1$ wants to initiate a communication session with IP communication device 18, IP communication device 16 generates communication session data that is destined for IP communication device 18 so as to establish a communication session between these two IP communication devices.

Initially, the communication session data generated by the IP communication device 16 will include (i) message header information; and (ii) a session initiation message that is generated according to a particular session initiation protocol used by the IP communication device 16. The message header information may contain identification characteristics associated with the IP communication device 16. For example, the identification characteristics may include an indication of an IP address, a software version, a hardware version, a vendor, a product manufacturer and/or a product model associated with the given IP communication device 16, among other possible information.

The session initiation message includes information used to establish a communication session with the destination IP communication device 18. In a non-limiting example, the session initiation message may include an "INVITE" message that includes routing and addressing information, and potentially appropriate call handling information that should be implemented by the destination IP communication device 18.

Once generated, this communication session data is issued over the packet based network 10 towards the destination IP communication device 18. As the communication session data travels over the packet-based network 10, it passes through the network entity 24 of the service provider core network 22. A non-limiting block diagram of the functional components of the network entity 24, according to the present invention, is shown in FIG. 3.

Figure 3:
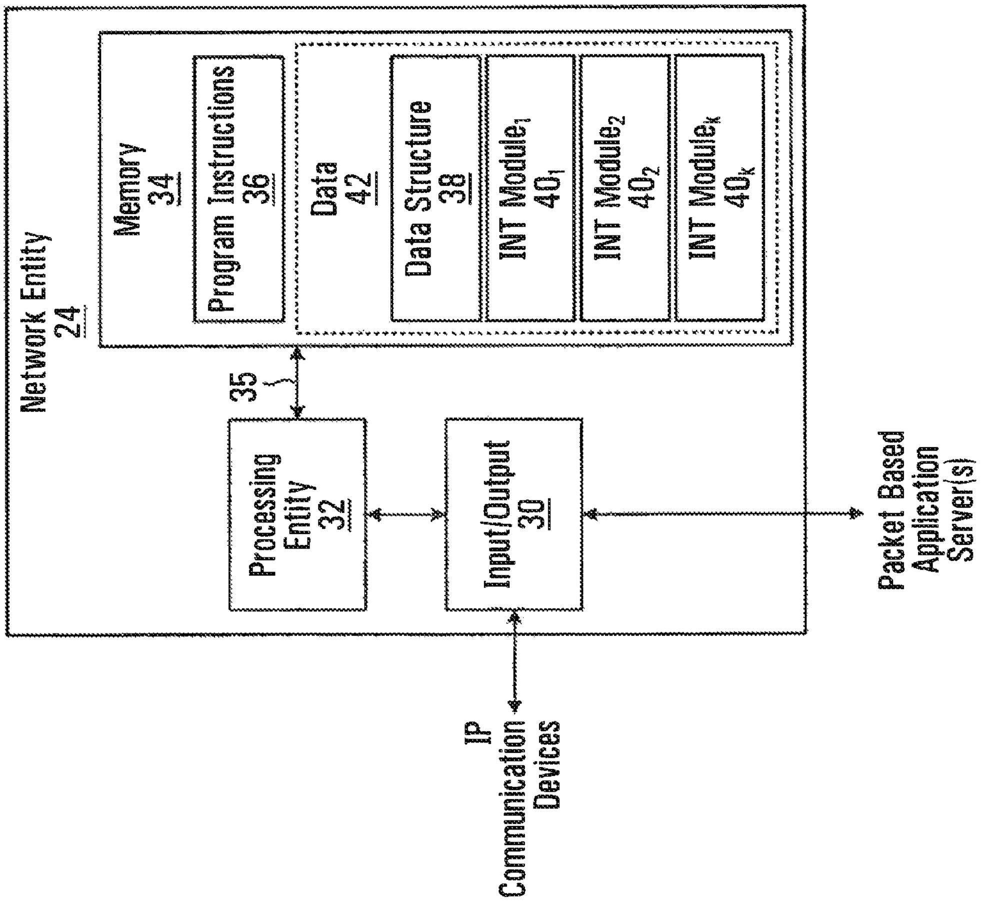
FIG. 3 shows a non-limiting block diagram of the network entity shown in FIG. 1.

In accordance with the non-limiting embodiment shown in FIG. 3, the network entity 24 comprises an input/output 30 for being able to receive/transmit communication session data with a plurality of IP communication devices (such as IP communication devices 14, 16, 18, 20) and for being able to receive/transmit communication session data to one or more packet-based application servers 26. Although the input/output 30 has been shown as being one component, it should be appreciated that there could be separate components for the inputs and outputs. There could also be a separate input/output for exchanging information with the IP communication devices and for exchanging information with the packet-based application servers 26. The network entity 24 further comprises a processing entity 32 that is in communication with a memory unit 34 over a databus 35. The memory unit 34 stores data 42 and program instructions 36 that can be accessed by the processing entity 32 for implementing the functionality that will be described in more detail below.

Figure 2:
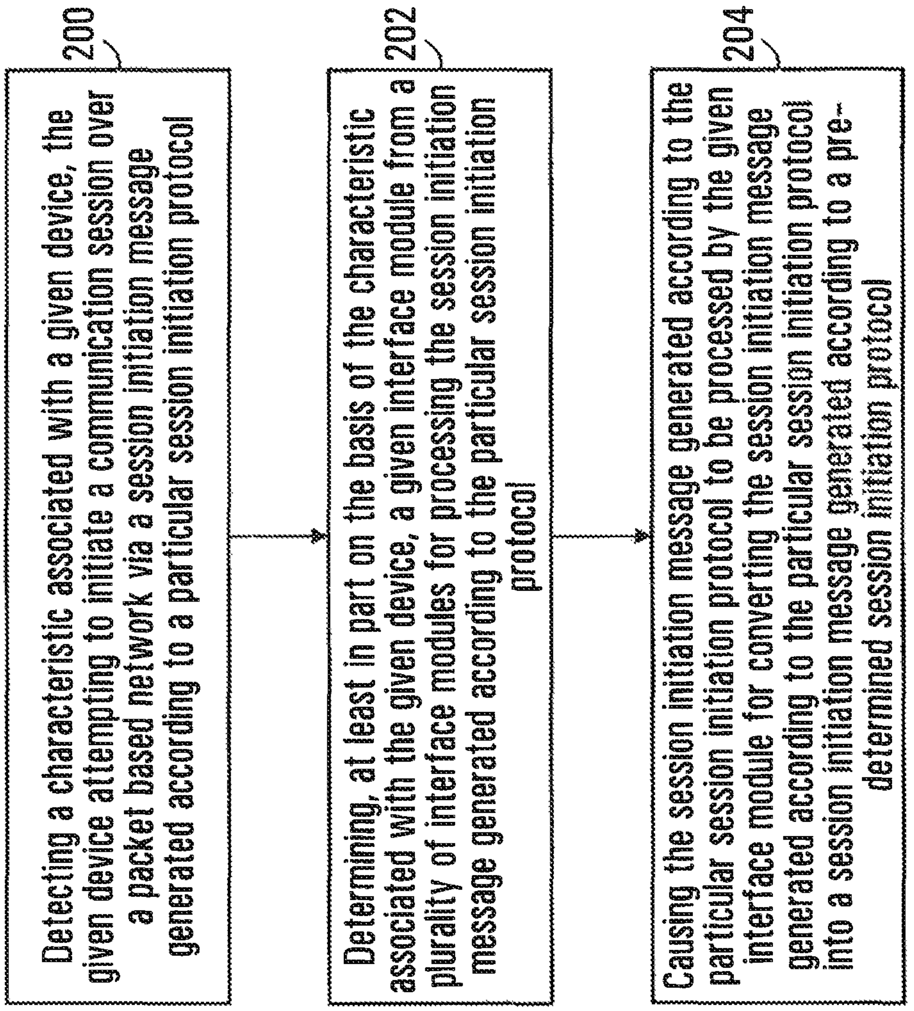
FIG. 2 shows a flowchart illustrating a non-limiting example of a method for causing the conversion of a session initiation message between two session initiation protocols.

Referring now to FIG. 2, and keeping with the example started above, upon receipt at the processing entity 32 of the communication session data generated by the originating IP communication device 16, at step 200 the network entity 24 detects a characteristic associated with the IP communication device 16. This detection of a characteristic associated with the IP communication device 16 may be done by considering the information contained in the header info) illation of the communication session data, which as described above, may contain identification information associated with the IP communication device 16. As such, by considering this identification information, the processing entity 32 may detect a characteristic of the IP communication device 16 such as its IP address, the product model or the hardware version associated with the IP communication device 16, or the vendor of the IP communication device 16, among other possibilities. For the sake of this example, let us assume that the characteristic that is detected by the processing entity 32 at step 200 is the vendor associated with IP communication device 16, namely Vendor A.

At step 202, the network entity 24 determines, at least in part on the basis of the characteristic associated with the IP communication device 16 (which in this example is Vendor A), an interface module from a plurality of interface modules for processing the session initiation message. As will be described in more detail below, the purpose of this processing is to convert the session initiation message that was generated by the originating IP communication device 16 according to a particular session initiation protocol, into a session initiation message that is generated according to a pre-determined session initiation protocol.

The pre-determined session initiation protocol may be a standard session initiation protocol that is used by a service provider and that is known to be readable and understandable by most IP communication devices (and network equipment that routes communication sessions to more traditional endpoint equipment, such as POTS phones or cell phones). Alternatively, the pre-determined session initiation protocol may be a standard session initiation protocol that is common to a plurality of service providers. In yet a further alternative, the pre-determined session initiation protocol may be the session initiation protocol being used by the destination IP communication device 18.

In accordance with a non-limiting example of implementation, the processing entity 32 determines the given interface module from a plurality of interface modules by accessing a data structure that stores associations between a plurality of interface modules and device characteristics. Shown in FIG. 4 is a non-limiting example of a data structure 38 suitable for being accessed by the processing entity 32 in order to determine a given interface module from a plurality of interface modules. The data structure 38 may be stored within the memory unit 34 of the network entity 24 (as shown in FIG. 3), or alternatively, may be located elsewhere within the packet-based network 10 at a location that can be accessed by the processing entity 32 when needed.

As shown in FIG. 4, the data structure 38 includes a plurality of entries $\mathbf{44}_{1\text{-}k}$ that are each associated with a different device characteristic. The device characteristics may include IP addresses, software versions, hardware versions, vendors, product manufacturers and/or product models associated with different IP communication devices that use the packet-based network 10. The above list of device characteristics is included for the sake of example only, and may include other device characteristics that have not been explicitly listed.

In the non limiting embodiment shown, each of the entries $\mathbf{44}_{1\text{-}k}$ includes a data element indicative of a device characteristic 50, a session initiation protocol 54 associated with that device characteristic and an interface module 56 associated with that device characteristic. Within the data structure 38 are listed a plurality of device characteristics 50, a plurality of session initiation protocols 54 and a plurality of interface modules 56. Each different device characteristic 50 appears only once in the data structure 38, whereas the certain session initiation protocols in the plurality of session initiation protocols 54, may appear multiple times since a given session initiation protocol may be associated with more than one of the different device characteristics. For example, $\text{sip}_1$ is associated with both the device characteristic of entry $\mathbf{44}_1$ and the device characteristic of entry $\mathbf{44}_4$. Likewise, certain interface modules in the plurality of interface modules 56 may appear multiple times since a given interface module may be associated with more than one of the different device characteristics. As shown, interface $\text{module}_1$ is associated with both the device characteristic of entry $\mathbf{44}_1$ and the device characteristic of entry $\mathbf{44}_4$.

Although data structure 38 shown in FIG. 4 stores associations between device characteristics, a plurality of session initiation protocols and a plurality of interface modules, it should be appreciated that these associations may be distributed between multiple data structures without departing from the spirit of the invention. For example, it is possible that a first data structure may store associations between device characteristics and a plurality of session initiation protocols, and a second data structure may store associations between session initiation protocols and interface modules. It is also possible that a third data structure may store associations between device characteristics and a plurality of interface modules.

Referring back to the present example, at step 202 in order to determine a given interface module from a plurality of interface modules, the processing entity 32 accesses the data structure 38 and compares the characteristic of the IP communication device determined at step 200 with the device characteristics stored in the data structure 38. In this manner, the processing entity 32 is able to locate a matching device characteristic. Once the processing entity 32 has located the matching device characteristic, the given interface module is the interface module that is associated with the matching device characteristic within the entry $\mathbf{44}_{1\text{-}k}$ of the matching device characteristic.

Keeping with the present example, the processing entity 32 will determine that the device characteristic within entry $\mathbf{44}_1$ (which is Vendor A) is the matching device characteristic to the device characteristic detected at step 200. As such, network entity 32 determines that it is interface $\text{module}_1$ that is the interface module that is associated with the matching device characteristic. As such, it is interface $\text{module}_1$ that should be used to process the session initiation message that was generated by IP communication device 16 according to the particular session initiation protocol.

By using data structure 38, which stores associations between the device characteristics and a plurality of interface modules, the processing entity 32 needs only to access a single data structure in order to determine the given interface module. However, in the case where the data structures are distributed between a first data structure that stores associations between device characteristics and a plurality of session initiation protocols, and a second data structure stores associations between session initiation protocols and a plurality of interface modules, the processing entity would need to access both of these data structures in order to determined the given interface module. More specifically, the processing entity 32 would first have to determine a given session initiation protocol associated with the matching device characteristic in the first data structure, and then would have to access the second data structure in order to determine the given interface module associated with the given session initiation protocol determined from the first data structure.

In the case where the network entity 24 is operative to cause the session initiation message according to the first session initiation protocol to be converted into a session initiation message according to the session initiation protocol being used by the destination IP communication device 18, the processing entity 32 may have to access an additional data structure (not shown) to determine what session initiation protocol is being used by the destination IP communication device 18. This additional data structure may store associations between IP addresses used by different devices and their associated session initiation protocols. As such, on the basis of the IP address of the destination IP communication device 18, which can be obtained by the processing entity 32 on the basis of routing information, a session initiation protocol being used by the destination IP communication device 18 can be determined. Then, in order to determine the given interface module, the processing entity 32 may have to access a further data structure (not shown) that associates a plurality of interface modules with both an originating session initiation protocol and a destination session initiation protocol.

As used herein, the term "interface module" refers to either a software module or a hardware module that is able to convert or translate session initiation information generated according to a particular session initiation protocol into session initiation information generated according to a pre-determined session initiation protocol. Such an interface module may include an Application Programming Interface (API). The conversion or translation of a session initiation message may involve:

- changing the manner in which a given call handling feature within the session initiation message is identified;
- removing any vendor-specific extensions;
- adding any extensions required for the pre-determined session initiation protocol; as well as
- any other function needed to convert or translate information according to the predetermined session initiation protocol into information according to the pre-determined session initiation protocol.

In accordance with the present invention, each interface module in the plurality of interface modules is associated with one or more session initiation protocols, such that a given interface module is only able to convert or translate information received in one of its associated session initiation protocols into information in the pre-determined session initiation protocol. In accordance with a non-limiting example, each interface module is associated with one session initiation protocol, such that each interface module is only able to convert information from its associated session initiation protocol into the pre-determined session initiation protocol. As such, session initiation messages generated according to different session initiation protocols need to be processed by different interface modules in order to be converted into session initiation messages generated according to the pre-determined session initiation protocol.

At step 204, once the processing entity 32 has determined the given interface module from the plurality of interface modules, the processing entity 32 causes the session initiation message that was generated by the IP communication device 16 according to the particular session initiation protocol to be processed by the given interface module (which in the case of the above example is interface $module_1$). By causing the session initiation message to be processed by the given interface $module_1$, the session initiation message according to the particular session initiation message is converted into a session initiation message according to a pre-determined session initiation protocol.

Causing the session initiation message to be processed by the given interface module may be done in a variety of different manners. In accordance with a first non-limiting example, the plurality of interface modules $\mathbf{40}_{1-k}$ are software modules that are stored within the memory unit 34 of the network entity 24, as shown in FIG. 3. In this case, causing the session initiation message to be processed by the given interface module involves activating the given interface module such that the software module is applied to the session initiation message. In the case where the interface module comprises an Application Programming Interface, the interface module may function through an API to convert the session initiation message into a session initiation message according to the pre-determined session initiation protocol.

Figure 5:
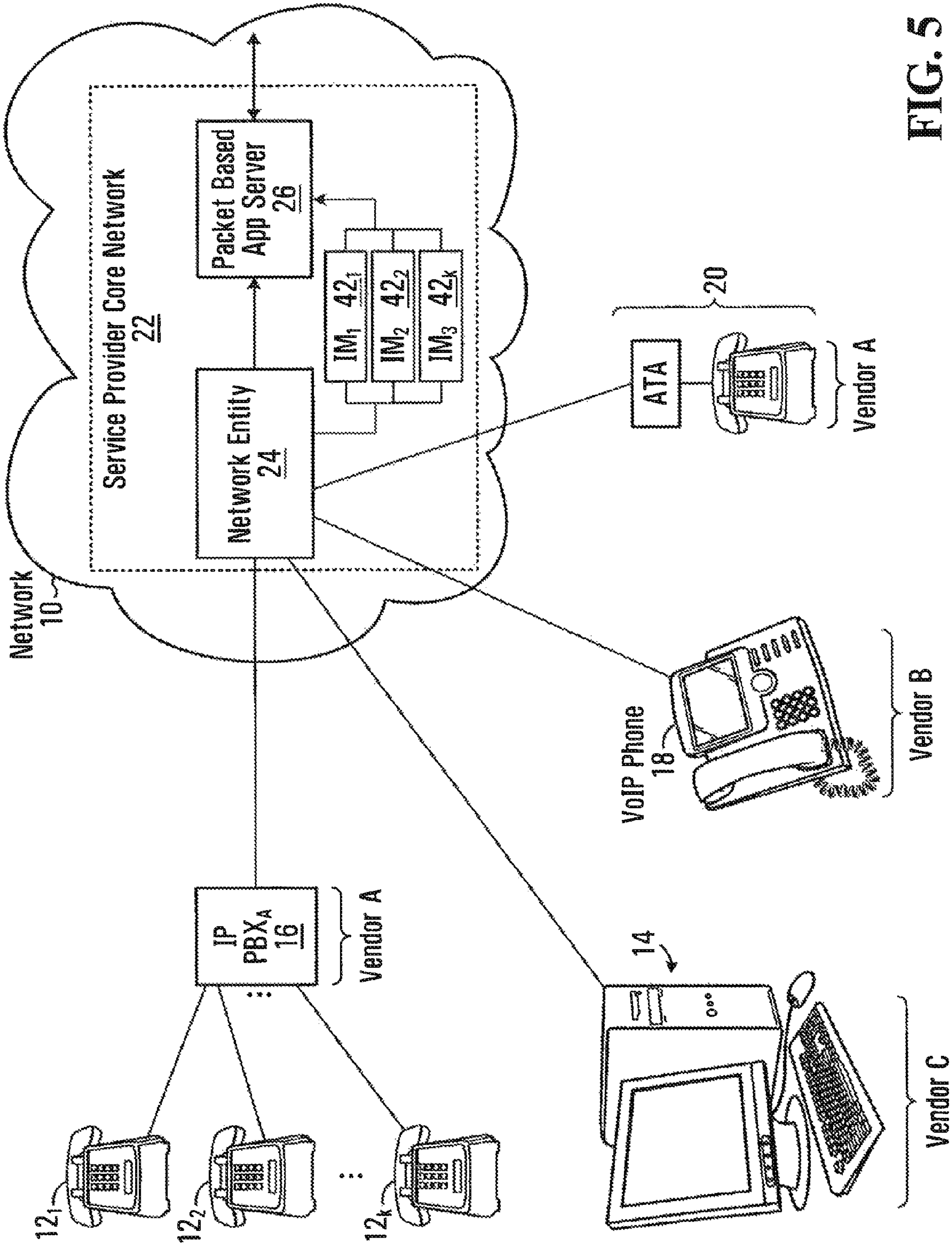
FIG. 5 shows a non-limiting block diagram of a communications network architecture according to a second example of implementation of the present invention.

In accordance with a second non-limiting example, the interface modules $\mathbf{42}_{1-k}$ are software modules or hardware modules that are located remotely from the network entity 24, as shown in FIG. 5. The interface modules $\mathbf{42}_{1-k}$ are located at a location that is known to the network entity 24. As such, causing the session initiation message to be processed by the given interface $module_1$ involves re-directing the session initiation message to the location of the given $interface_1$ module for processing. This re-direction may be done by directing the session initiation message to the URI of the given interface $module_1$. The network entity 24 will have access to the location and routing information associated with the interface modules in the plurality of interface modules, such that the session initiation message that needs to be processed can be directed and routed towards the given $interface_1$ module of the plurality of interface modules $\mathbf{42}_{1-k}$.

Once the session initiation message generated according to the particular session initiation message has been converted by the given interface module into a session initiation message according to a pre-determined session initiation protocol, the session initiation message according to the predetermined session initiation message is routed through the packet based network 10 to the destination IP communication device 18. As mentioned above, the pre-determined session initiation protocol can be a standard protocol used by the network service provider that is known to be understandable to the majority of IP communication devices. As such, the session initiation message that is received by the destination IP communication device 18 in accordance with the pre-determined session initiation message, is able to be accurately read and understood.

Once the above process has been performed and the given interface module has been determined, the processing entity 32, which may be part of a session border controller, may generate an entry in another data structure (not shown) that associates the IP address that has been assigned to that IP communication device directly with the given interface module that has been determined. In this manner, for all subsequent communications from the IP communication device, the processing entity 32 may easily identify, on the basis of the IP address assigned to that IP communication device, the given interface module that should be used to process the session initiation messages generated by that IP communication device. In this manner, once the processing entity 32 has determined the given interface module on the basis of a device characteristic associated with the IP communication device (which could have been the vendor, the software version, the product model, etc.) the processing entity 32 is able to route further communication messages from that IP communication device directly to the given interface module for converting the session initiation messages generated by that IP communication device into session initiation messages generated according to the pre-determined session initiation protocol.

Once the destination IP communication device 18 has received the session initiation 30 message according to the pre-determined session initiation message from the originating IP communication device 16, the destination IP communication device 18 then needs to send a response session initiation message. The destination IP communication device 18 thus generates communication session data which includes (i) header information and a (ii) session initiation message according to a particular session initiation protocol that is different from the one used by the originating IP communication device 16. This communication session data is directed to the originating IP communication device 16 through the packet-based network 10, such that the communication session data is intercepted by the network entity 24 which performs the same process on the communication session data from the destination IP communication device 18 as it did on the communication session data from the originating IP communication device 16.

In this manner, even though both of the IP communication devices 16 and 18 generate and transmit session initiation messages according to different session initiation protocols, they both receive session initiation messages which they can both, presumably, be able to accurately read and understand.

B. Initiating an Action when a Session Initiation Protocol is not a Pre-Determined Session Initiation Protocol A second manner in which the network entity 24 can attempt to reduce the likelihood that a session initiation message from an IP communication device will be misunderstood by a receiving JP communication device, will now be described in more detail with reference to FIG. 1 and the flow chart shown in FIG. 6.

Keeping with the same example described above, let us assume that telephone 12$_1$ is attempting to initiate a communication session with IP communication device 18. Upon detection at IP communication device 16 (the IP PBX) that telephone 12$_1$ wants to initiate a communication session with IP communication device 18, IP communication device 16 generates communication session data that is destined for IP communication device 18 so as to establish a communication session between these two IP communication devices.

Initially, the communication session data generated by the IP communication device 18 will include (i) message header information; and (ii) a session initiation message that is generated according to a particular session initiation protocol that is used by IP communication device 16. As previously described, the message header information may contain identification characteristics associated with the originating IP communication device 16 and the session initiation message includes information used to establish a communication session with the destination IP communication device 18.

Once generated, this communication session data is issued over the packet based network 10 towards the destination IP communication device 18. As the communication session data travels over the packet-based network 10, it passes through the network entity 24 of the service provider core network 22.

Figure 6:
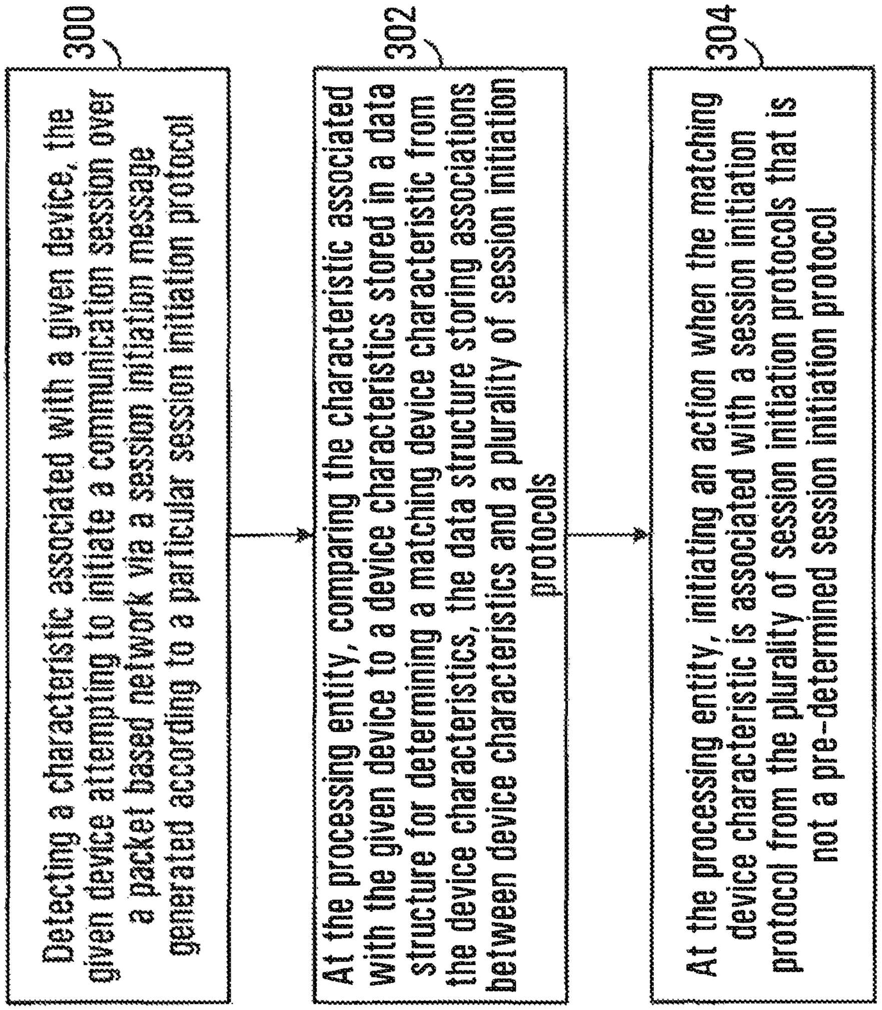
FIG. 6 shows a flowchart illustrating a non-limiting example of a method for causing an action to be initiated when a session initiation message has been generated according to a session initiation protocol that is not a pre-determined session initiation message.

Referring now to FIG. 6, at step 300, upon receipt at the processing entity 32 of the communication session data generated by the originating IP communication device 16, the network entity 24 detects a characteristic associated with the IP communication device 16. This detection of a characteristic associated with the IP communication device 16 may be done by considering the identification information contained in the header information of the communication session data. As such, by considering this identification information, the processing entity 32 may detect a characteristic such as the IP address, the product model or the hardware version associated with the IP communication device 16. Keeping with the example described above, let us assume that the characteristic that is detected by the processing entity 32 during step 200 is the vendor associated with IP communication device 16, namely Vendor A.

At step 302, the network entity 24 compares the characteristic associated with the IP communication device 16 (which in this example is Vendor A), with device characteristics stored in a data structure. This comparison is done in order to determine a matching device characteristic from the device characteristics within the data structure. The data structure can be a data structure, such as data structure 38 shown in FIG. 4, that stores associations between device characteristics and a plurality of session initiation protocols. As previously described, the data structure 38 may be stored within the memory unit 34 of the network entity 24 (as shown in FIG. 3), or alternatively, may be located elsewhere within the packet-based network 10 at a location that can be accessed by the processing entity 32 when needed.

As described above, the processing entity 32 accesses the data structure 38 and compares the characteristic of the IP communication device determined at step 300 with the device characteristics stored in the data structure. Each different device characteristic 50 appears only once in the data structure 38, whereas the different session initiation protocols in the plurality of session initiation protocols 54 may appear multiple times since a given session initiation protocol may be associated with more than one of the different device characteristics. For example, $sip_1$ is associated with both the device characteristic of entry 44$_1$ and the device characteristic of entry 44$_4$.

By comparing the characteristic of the IP communication device determined at step 300 with the device characteristics stored in the data structure 38, the processing entity 32 is able to locate a matching device characteristic. In the present example, the matching device characteristic is Vendor A found in entry 44$_1$. Once the processing entity 32 has located the matching device characteristic, the processing entity 32 determines the session initiation protocol that is associated with the matching device characteristic, which in the present example is the session initiation protocol$_1$ contained in entry 44$_1$.

At step 304, once the processing entity 32 has determined the associated session initiation protocol from the data structure 38, the processing entity 32 initiates an action when the matching device characteristic is associated with a session initiation protocol that is not a pre-determined session initiation protocol. This determination can be done by comparing the associated session initiation protocol with an identification of the pre-determined session initiation protocol that is stored within the memory unit 34 of the network entity 24, or at a remote location that is accessible by the network entity 24.

As previously described, the pre-determined session initiation protocol may be a standard session initiation protocol that is used by a service provider and that is known to be readable and understandable by most IP communication devices (and network equipment that routes communication sessions to more traditional end-point equipment).

It should be appreciated that in the case where the associated session initiation protocol (which in this example is session initiation protocol$_1$) is the same as the pre-determined session initiation protocol, then no action is initiated by the network entity 24, and the session initiation message that was generated by IP communication device 16 continues its travel towards the destination IP communication device 18 unaffected.

In the case where the associated session initiation protocol (which in this example is session initiation protocol$_1$) is different from the pre-determined session initiation protocol, then the network entity 24 initiates an action. As will be described in more detail below, the action could be:

1. causing the session initiation message generated according to the associated session initiation protocol to be converted into a session initiation message according to the pre-determined session initiation protocol.

2. issuing a message to a user of the originating IP communication device indicative that the IP communication device is not using an appropriate session initiation protocol.
3. issuing a message to a user of the originating IP communication device that they should download a vendor “patch” or “upgrade” for causing their IP communication device to generate session initiation messages according to an appropriate session initiation protocol.
4. causing the originating IP communication device to automatically download a vendor “patch” or “upgrade” for causing the IP communication device to use an appropriate session initiation protocol.

In the case where the processing entity 32 causes the session initiation message generated according to the associated session initiation protocol to be converted into a session initiation message according to the pre-determined session initiation protocol, the network entity may access a data structure, such as data structure 38, that stores associations between device characteristics and a plurality of interface modules. In this manner, the processing entity 32 is able to determine a given interface module that can process the session initiation message for converting the session initiation message into a session initiation message according to a pre-determined session initiation protocol.

The manner in which the processing entity 32 determines the given interface module and causes the session initiation message to be processed by the given interface module can be done according to the method described above with respect to FIG. 2, and as such will not be described in more detail herein.

In the case where the network entity 24 issues a message to the user of the IP communication device, which could be that the IP communication device is not using an appropriate session initiation protocol, or that the IP communication device should download a vendor “patch” or “upgrade”, the processing entity 32 may access a data structure (not shown) that stores appropriate error messages that should be issued to an IP communication device. The data structure may store associations between device characteristics and appropriate error messages, or the data structure may store associations between session initiation protocols and appropriate error messages. As such, once the processing entity 32 determines at step 304 that the matching device characteristic is associated with a session initiation protocol that is not the pre-determined session initiation protocol, the processing entity may access the above described data structure (not shown) for determining either on the basis of the matching device characteristic, or the associated session initiation protocol, an appropriate error message to issue to the originating IP communication device.

Once the error message, which could be an error code or a message in text form, has been determined, the network entity 24 causes the error message to be issued to the IP communication device, such that the IP communication device can relay the information to a human user. In many cases, such as in the case of the softphone 14 and the VoIP phone 18, the IP communication devices includes a display screen for displaying information to a user. As such, the display screen may display the error code or message in text form to the human user. The human user can then take the necessary steps to ensure that the IP communication device is modified to be able to generate and understand session initiation messages in accordance with an acceptable session initiation protocol. The message from the network entity 24 may be routed to the IP communication device via an IP address or URI associated with the IP communication device.

In the case where the action involves causing the originating IP communication device to automatically download a vendor “patch” or “upgrade”, the processing entity 32 may have access to a plurality of software modules that can be forced to the originating IP communication device. The particular software module that is forced on the originating IP communication device may be determined on the basis of the detected device characteristic, or on the particular session initiation protocol associated with that device characteristic. Once the software module is forced to the originating IP communication device, a computing unit at the originating IP communication device may execute the software module for causing the IP communication device to access a vendor URI or website, select an appropriate “patch” or “upgrade”, and download the appropriate “patch” or “upgrade” for installation at the originating IP communication device.

In an alternative embodiment, instead of causing the IP communication device to access a vendor URI or website in order to obtain the “patch” or “upgrade”, the software module that is forced to the IP communication device may itself be the “patch” or “upgrade”. As such, once the software module is forced to the originating IP communication device, a computing unit at the originating IP communication device may execute the software module for installing the “patch” or “upgrade” at the originating IP communication device.

In accordance with a non-limiting example of implementation, the processing entity 32 is adapted to process the data 42 and the program instructions 36 stored in the memory unit 34 for implementing the functionality described above in the description and the drawings. In a specific example of implementation, the memory unit 34 includes a program element contained within the program instructions 36, for execution by the processing entity 32. Those skilled in the art should appreciate that the program instructions may be written in a number of programming languages for use with many computer architectures or operating systems. For example, some embodiments may be implemented in a procedural programming language (e.g., “C”) or an object oriented programming language (e.g., “C++” or “JAVA”).

As such, all or part of the functionality previously described herein with respect to the network entity 24 may be implemented as software consisting of a series of instructions for execution by a the processing entity 32. The series of instructions could be stored elsewhere than within the memory of the network entity 24. They may also be stored on a medium which is fixed, tangible and readable directly by the processing entity 32 (e.g., removable diskette, CD-ROM, ROM, PROM, EEPROM or fixed disk) or the instructions could be stored remotely but transmittable to the processing entity 32 over the network 10.

Those skilled in the art should appreciate that in some embodiments of the invention, all or part of the functionality previously described herein with respect to the network entity 24, may be implemented as pre-programmed hardware or firmware elements (e.g., application specific integrated circuits (ASICs), electrically erasable programmable read-only memories (EEPROMs), etc.) or other related components.

While specific embodiments of the present invention have been described and illustrated, it will be apparent to those skilled in the art that numerous modifications and variations can be made without departing from the scope of the invention as defined in the appended claims.

What is claimed is:

1. A method, comprising:

a) at a processing entity, detecting a characteristic associated with a given device, the given device attempting to initiate a communication session over a packet based network via a session initiation message generated according to a particular session initiation protocol, wherein the characteristic of the given device is one of a hardware version, a vendor, a product manufacturer and a product model associated with the given device;

b) at the processing entity, comparing the characteristic associated with the given device to a plurality of device characteristics stored in a data structure for determining a matching device characteristic from the plurality of device characteristics, the data structure storing associations between device characteristics and a plurality of session initiation protocols;

c) at the processing entity, initiating an action when the matching device characteristic is associated with a session initiation protocol from the plurality of session initiation protocols that is not a pre-determined session initiation protocol.

2. A method as defined in claim 1, wherein the action involves advising a customer associated with the given device that the particular session initiation protocol used by the given device is not acceptable for initiating the communication session.

3. A method as defined in claim 1, wherein the action involves causing the session initiation message generated by the given device according to the particular session initiation protocol to be converted into a second session initiation message according to the pre-determined session initiation protocol.

4. A method as defined in claim 3, further comprising, at an interface module, converting the session initiation message generated by the given device according to the particular initiation protocol into a second session initiation message according to the pre-determined session initiation protocol.

5. A method as defined in claim 4, wherein the session initiation message comprises an identifier of a call handling feature, and wherein converting the session initiation message generated according to the particular session initiation protocol into the session initiation message generated according to the pre-determined session initiation protocol comprises changing the identifier of the call handling feature.

6. A method as defined in claim 4, wherein the session initiation message comprises at least one vendor-specific extension, and wherein converting the session initiation message generated according to the particular session initiation protocol into the session initiation message generated according to the pre-determined session initiation protocol comprises removing the at least one vendor-specific extension.

7. A method as defined in claim 4, wherein the pre-determined session initiation protocol is associated with an extension, and wherein converting the session initiation message generated according to the particular session initiation protocol into the session initiation message generated according to the pre-determined session initiation protocol comprises adding the extension to the session initiation message.

8. A method as defined in claim 4, wherein causing the session initiation message generated according to the particular session initiation protocol to be processed by the given interface module comprises re-directing the session initiation message to a location of the given interface module.

9. A method as defined in claim 8, wherein the location of the given interface module comprises a URI of the given interface module.

10. A method as defined in claim 1, wherein the action involves issuing a message to a user of the given device to instruct the user to download a vendor patch or upgrade for causing the given communication device to generate session initiation messages according to the pre-determined session initiation protocol.

11. A method as defined in claim 1, wherein the action involves causing the given device to download a vendor patch or upgrade for generating session initiation messages according to the pre-determined session initiation protocol.

12. A method as defined in claim 1, wherein the action involves issuing a message to the given device to be relayed to a human user.

13. A method as defined in claim 12, wherein the message comprises at least one of an error code and a message in text form.

14. A method as defined in claim 1, wherein the given device is one of an IP phone, an ATA device, a VoIP enabled computer and a PBX device.

15. A method as defined in claim 1, wherein the pre-determined session initiation protocol is a standard session initiation protocol used by a service provider that provides the given device with access to the packet-based network.

16. A method as defined in claim 1, wherein the particular session initiation protocol and the pre-determined session initiation protocol are versions of Session Initiation Protocol (SIP).

17. A method, comprising:

at a session border controller, provisioning a communication device that is newly interacting with a network, said provisioning comprising:

a) at the session border controller, assigning an identifier to the communication device; and b) at the session border controller, creating an association between the identifier and a given interface module from a plurality of interface modules; and at the session border controller, on the basis of the identifier, causing session initiation messages generated by the communication device according to a first session initiation protocol to be converted by the given interface module into session initiation messages generated according to a second session initiation protocol, the second session initiation protocol being different from the first session initiation protocol.

18. A method as defined in claim 17, wherein the identifier comprises an IP address.

19. A method as defined in claim 18, wherein said creating comprises generating an entry in a data structure, the entry associating the identifier and the given interface module.

* * * * *